United States Patent
Park et al.

(10) Patent No.: US 11,455,065 B2
(45) Date of Patent: Sep. 27, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Yong Soo Park, Gyeonggi-do (KR); Sung Woo Yu, Gyeonggi-do (KR); Jae Hyun Lee, Gyeonggi-do (KR); Keon Kim, Gyeonggi-do (KR); Ju In Yoon, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/365,159

(22) Filed: Jul. 1, 2021

(65) Prior Publication Data

US 2021/0326004 A1 Oct. 21, 2021

Related U.S. Application Data

(63) Continuation of application No. PCT/KR2020/000011, filed on Jan. 2, 2020.

(30) Foreign Application Priority Data

Jan. 2, 2019 (KR) .................. 10-2019-0000349
Dec. 30, 2019 (KR) .................. 10-2019-0177277

(51) Int. Cl.
G06F 3/044 (2006.01)
G06F 3/041 (2006.01)
G06F 3/045 (2006.01)

(52) U.S. Cl.
CPC ............ *G06F 3/0445* (2019.05); *G06F 3/045* (2013.01); *G06F 3/0412* (2013.01); *G06F 3/0446* (2019.05)

(58) Field of Classification Search
None
See application file for complete search history.

(56) References Cited

U.S. PATENT DOCUMENTS

2014/0346027 A1* 11/2014 Li .................. G06F 3/0443
200/600
2018/0308903 A1* 10/2018 Jeong ................ H01L 27/3276

FOREIGN PATENT DOCUMENTS

KR 10-1003498 B1 12/2010
KR 10-1658139 B1 9/2016
(Continued)

OTHER PUBLICATIONS

International Search Report for PCT/KR2020/000011 dated Apr. 7, 2020.

*Primary Examiner* — Stephen T. Reed
(74) *Attorney, Agent, or Firm* — The PL Law Group, PLLC

(57) ABSTRACT

A touch sensor according to an embodiment of the present invention includes a base layer, a first electrode layer disposed on the base layer, and a second electrode layer disposed at an upper level of the first electrode layer. The first electrode layer includes a plurality of first sensing electrode rows extending in a first direction parallel to a top surface of the base layer, and first traces branched from each of the first sensing electrode rows and alternately distributed on both lateral portions of the base layer. The second electrode layer includes a plurality of second sensing electrode columns extending in a second direction that is parallel to the top surface of the base layer and intersects the first direction, and second traces branching from the second sensing electrode columns.

16 Claims, 5 Drawing Sheets

(56) References Cited

FOREIGN PATENT DOCUMENTS

| | | |
|---|---|---|
| KR | 10-2017-0015821 A | 2/2017 |
| KR | 10-1749861 B1 | 6/2017 |
| WO | WO 2013/063176 A1 | 5/2013 |

\* cited by examiner

2nd direction

1st direction

TOUCH SENSOR AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2020/000011 with an International Filing Date of Jan. 2, 2020, which claims the benefit of Korean Patent Applications No. 10-2019-0000349 filed on Jan. 2, 2019 and No. 10-2019-0177277 filed on Dec. 30, 2019 at the Korean Intellectual Property Office, the disclosures of which are incorporated by reference herein in their entirety.

BACKGROUND

1. Field

The present invention relates to a touch sensor and an image display device including the same. More particularly, the present invention relates to a touch sensor including sensing electrodes and traces and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device. For example, as disclosed in Korean Patent Application Publication No. 2014-0092366, various image display devices combined with a touch screen panel including a touch sensor has been developed recently.

As a resolution of the display device is improved to. e.g., a QHD (Quad High Definition) level, a UHD (Ultra High Definition) level, etc., a high resolution of the touch sensor is also required. Further, as various sensing functions such as a fingerprint sensing are also recently applied to the display device, sensing electrodes and traces with a fine pitch for implementing a fingerprint sensing may be included in the touch sensor with a high degree of integration.

However, for example, as a density of the traces increases, a margin between adjacent traces may decreases, and a signal interference may occur. Further, when a mechanical stress from, e.g., a bending operation is applied, the traces may be easily damaged to result in a poor sensing.

Accordingly, developments of a touch sensor capable of implementing a high-resolution sensing function while maintaining mechanical and electrical reliability are required.

SUMMARY

According to an aspect of the present invention, there is provided a touch sensor having improved mechanical, electrical and operational reliability.

According to an aspect of the present invention, there is provided a window stack structure having improved mechanical, electrical and operational reliability.

According to an aspect of the present invention, there is provided a display device including a touch sensor with improved mechanical, electrical and operational reliability.

The above aspects of the present invention will be achieved by the following features or constructions:

(1) A touch sensor, including: a base layer; a first electrode layer disposed on the base layer; and a second electrode layer disposed on the base layer, the second electrode layer disposed at a different layer from that of the first electrode layer, wherein the first electrode layer includes: a plurality of first sensing electrode rows extending in a first direction parallel to a top surface of the base layer; and first traces branched from each of the first sensing electrode rows and alternately distributed on both lateral portions of the base layer, wherein the second electrode layer includes: a plurality of second sensing electrode columns extending in a second direction that is parallel to the top surface of the base layer and intersects the first direction; and second traces branching from the second sensing electrode columns.

(2) The touch sensor of the above (1), wherein the first traces are alternately connected to one end portions and the other end portions of the first sensing electrode rows.

(3) The touch sensor of the above (2), wherein a width of each of the first traces satisfies Equation 1 below:

$$0.1P \leq W1 < 2P \qquad \text{[Equation 1]}$$

(In Equation 1, W1 represents the width of the first trace, and P is a pitch of the first sensing electrode rows).

(4) The touch sensor of the above (1), further including an intermediate trace electrically connected to each of the first traces.

(5) The touch sensor of the above (4), wherein the intermediate trace includes a first portion connected to each of the first traces and extending in the first direction, and a second portion bent from the first portion and extending in the second direction.

(6) The touch sensor of the above (5), wherein a width of the first portion of the intermediate trace is greater than a width of the second portion of the intermediate trace.

(7) The touch sensor of the above (6), wherein the width of the first portion of the intermediate trace satisfies Equation 1 below:

$$0.1P \leq W1 < 2P \qquad \text{[Equation 1]}$$

(In Equation 1, W1 represents the width of the first portion of the intermediate trace, and P is the pitch of the first sensing electrode rows).

(8) The touch sensor of the above (4), further including an insulating layer formed on the base layer and formed between the first electrode layer and the second electrode layer.

(9) The touch sensor of the above (8), wherein the intermediate trace and the second electrode layer is disposed at the same layer.

(10) The touch sensor of the above (9), further including a contact penetrating through the insulating layer to connect the intermediate trace and the first trace with each other.

(11) The touch sensor of the above (9), wherein terminal end portions of the intermediate traces and the second traces are assembled together on one end portion of the insulating layer.

(12) The touch sensor of the above (11), further including a capping layer formed on the terminal end portions of the intermediate traces and the second traces.

(13) The touch sensor of the above (12), wherein the capping layer includes a transparent conductive oxide.

(14) The touch sensor of the above (1), wherein the first sensing electrode row includes a plurality of first sensing unit electrodes connected to each other along the first direction, and the second sensing electrode column includes a plurality of second sensing unit electrodes connected to each other along the second direction.

(15) The touch sensor of the above (14), wherein a sheet resistance of each of the first sensing unit electrodes and the second sensing unit electrodes is from 0.05 to 10Ω/□.

(16) The touch sensor of the above (14), wherein each of the first sensing unit electrodes and the second sensing unit electrodes has a width of 100 μm or less, and the first sensing unit electrodes and the second sensing unit electrodes are provided as fingerprint sensing electrodes.

(17) The touch sensor of the above (1), wherein the first sensing electrode row includes a plurality of first sub-electrode lines extending in the first direction and connected in parallel to each other, and the second sensing electrode column includes a plurality of second sub-electrode lines extending in the second direction and connected in parallel to each other.

(18) The touch sensor of the above (17), further including merging portions connecting the first sub-electrode lines to each other to define the first sensing electrode row, and connecting the second sub-electrode lines to each other to define the second sensing electrode column, wherein the first traces and the second traces extend from each of the merging portions.

(19) A window stack structure, including: a window substrate; and the touch sensor according to embodiments as described above.

(20) An image display device, including: a display panel; and the touch sensor according to embodiments as described above stacked on the display panel.

According to embodiments of the present invention, traces branching from the sensing electrodes may be alternately distributed in peripheral regions of both lateral portions of the touch sensor to increase a spacing or pitch between neighboring traces. Accordingly, a predetermined pitch may be maintained while increasing the number or integration degree of traces to implement a high-resolution and high-reliability touch sensor.

In exemplary embodiments, the sensing electrode and the traces may be formed in a double-layered structure, and lower traces may be assembled at the same level as that of upper traces using a contact. Thus, an electrical connection through, e.g., a flexible printed circuit board may be easily performed while implementing a fine-pitch and high-resolution sensing structure.

In exemplary embodiments, the touch sensor may be utilized as a high-resolution sensing structure such as a fingerprint sensor.

DETAILED DESCRIPTION OF THE EMBODIMENTS

Figure 1:
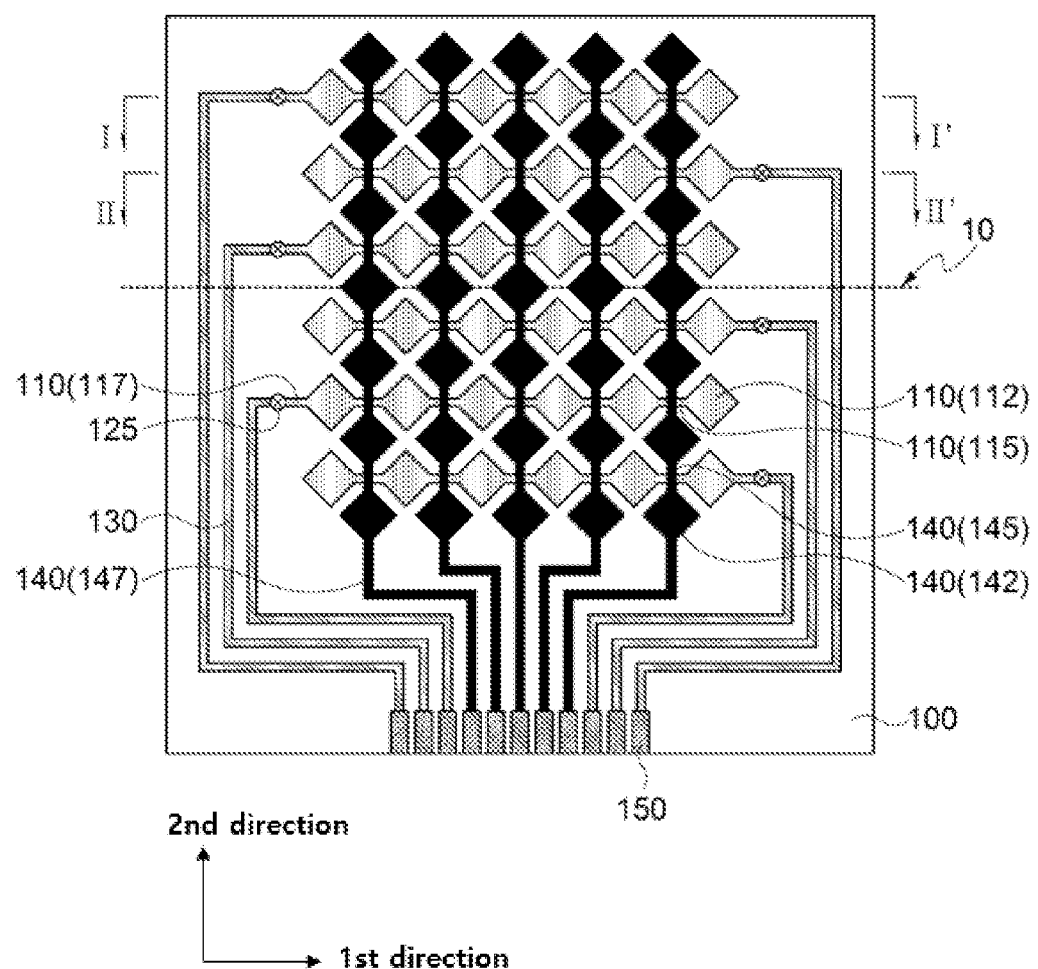
FIG. 1 is a schematic top planar view illustrating a touch sensor in accordance with exemplary embodiments.

According to exemplary embodiments of the present invention, there is provided a touch sensor including a plurality of sensing electrodes and traces, and providing high resolution and reliability sensing through a construction of the sensing electrodes and traces. Further, an image display device including the touch sensor is provided.

Hereinafter, the present invention will be described in detail with reference to the accompanying drawings. However, those skilled in the art will appreciate that such embodiments described with reference to the accompanying drawings are provided to further understand the spirit of the present invention and the subject matters to be protected are not interpreted as limited in those disclosed in the drawings.

In the accompanying drawings, two directions parallel to an upper surface of a base layer 100 and crossing each other are defined as a first direction and a second direction. The first direction and the second direction may be perpendicular to each other. For example, the first direction may correspond to a width direction or an X direction, and the second direction may correspond to a length direction or a Y direction.

The term "touch sensor" in the present application is used to encompass sensors that may generate a signal by a touch of a user's finger or a tool, and by a recognition of a shape of a user's fingerprint.

Figure 2:
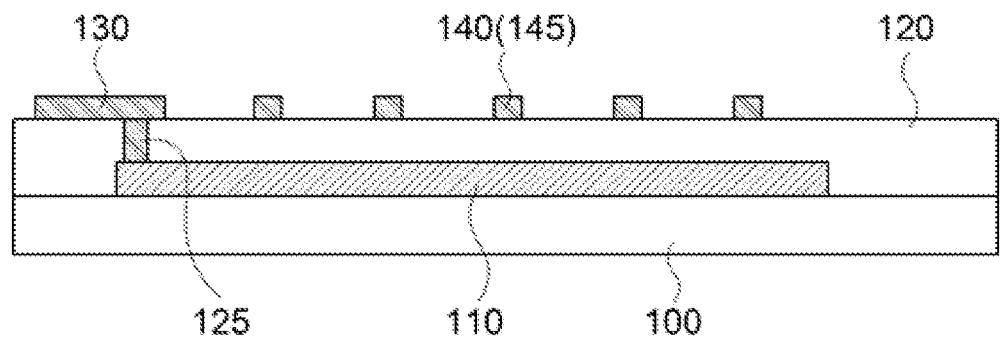
FIGS. 2 and 3 are schematic cross-sectional views illustrating a touch sensor in accordance with exemplary embodiments.
Figure 3:
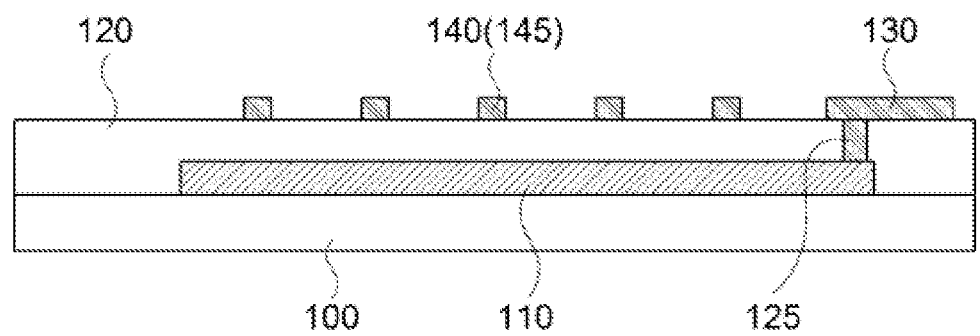

FIG. 1 is a schematic top planar view illustrating a touch sensor in accordance with exemplary embodiments. FIGS. 2 and 3 are schematic cross-sectional views illustrating a touch sensor in accordance with exemplary embodiments.

Specifically, FIG. 2 is a cross-sectional view taken along a line I-I' of FIG. 1 in a thickness direction of the touch sensor. FIG. 3 is a cross-sectional view taken along a line II-II' of FIG. 1 in the thickness direction of the touch sensor. For convenience of descriptions, illustration of an insulating layer is omitted in FIG. 1.

Referring to FIGS. 1 to 3, the touch sensor may include a base layer 100 and electrode layers 110 and 140 arranged on the base layer 100.

The base layer 100 is used to include a film-type substrate used as a support layer for forming the electrode layers 110 and 140, an insulating interlayer, or an object on which the electrode layers 110 and 140 are formed. In some embodiments, the base layer 100 may refer to a display panel on which the electrode layers 110 and 140 are directly formed.

For example, the base layer 100 may include a film material commonly used for a touch sensor without particular limitation, and may include, e.g., glass, a flexible polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride, a metal oxide, or the like.

The electrode layers 110 and 140 may include a first electrode layer 110 and a second electrode layer 140. The first electrode layer 110 and the second electrode layer 140 may be disposed at different levels or different layers. In exemplary embodiments, the second electrode layer 140 may be disposed at an upper layer of the first electrode layer 110.

In exemplary embodiments, as illustrated in FIGS. 2 and 3, the first electrode layer 110 may be formed on an upper surface of the base layer 100. An insulating layer 120 may be formed on the base layer 100 to cover the first electrode layer 110. The second electrode layer 140 may be formed on the insulating layer 120.

The insulating layer 120 may include an inorganic insulating material such as silicon oxide or silicon nitride, or an organic insulating material such as an acrylic resin or a siloxane-based resin. For example, the insulating layer 120 may be formed by a coating process such as spin coating, slit coating, etc., or a printing process such as an inkjet printing, an offset printing, etc. The insulating layer 120 may also be formed by a deposition process such as a chemical vapor deposition (CVD) process, a physical vapor deposition (PVD) process, or the like.

The first electrode layer 110 and the second electrode layer 140 may include silver (Ag), gold (Au), copper (Cu), aluminum (Al), platinum (Pt), palladium (Pd), chromium (Cr), titanium. (Ti), tungsten (W), niobium (Nb), tantalum (Ta), vanadium (V), iron (Fe), manganese (Mn), cobalt (Co), nickel (Ni), zinc (Zn), tin (Sn), calcium (Ca) or an alloy containing at least one of the metals (e.g., silver-palladium-copper (APC), copper-calcium (CuCa), etc.). These may be used alone or in combination of two or more therefrom.

The first electrode layer 110 and the second electrode layer 140 may include a transparent conductive oxide such as indium tin oxide (ITO), indium zinc oxide (IZO), zinc oxide (ZnO), indium zinc tin oxide (IZTO), cadmium tin oxide (CTO), etc.

The first electrode layer 110 and the second electrode layer 140 may include a stacked structure of a transparent conductive oxide and a metal. For example, the first electrode layer 110 and the second electrode layer 140 may have a double-layered structure of a transparent conductive oxide layer-metal layer, or a triple-layered structure of a transparent conductive oxide layer-metal layer-transparent conductive oxide layer. In this case, a flexible property may be improved by the metal layer and a signal transmission speed may also be improved by a low resistance of the metal layer while a corrosion resistance and a transparency may be improved by the transparent conductive oxide layer.

The first electrode layer 110 and the second electrode layer 140 may be formed by depositing the above-described conductive material by a PVD process such as a sputtering process, and then patterning by a wet or dry etching process.

The first electrode layer 110 may include first sensing unit electrodes 112 and a first connector 115. For example, the first sensing unit electrodes 112 may be connected to each other by first connectors 115 and may be arranged in a first direction. Accordingly, a first sensing electrode row extending in the first direction may be defined. A plurality of the first sensing electrode rows may be arranged in a second direction.

In exemplary embodiments, the first connector 115 and the first sensing electrode unit electrode 112 may be integrally connected to each other to be substantially provided as a single member.

The first electrode layer 110 may further include a first trace 117. The first trace 117 may branch in the first direction from an end portion of each of the first sensing electrode rows.

In exemplary embodiments, the first traces 117 may be alternately distributed on both lateral portions of the touch sensor or the base layer 100 (e.g., both lateral portions in the first direction).

As illustrated in FIG. 1, the first trace 117 may alternately branch from one end portion and the other end portion of the first sensing electrode rows along the second direction.

As illustrated in FIGS. 2 and 3, the insulating layer 120 may cover the first electrode layer 110 on the base layer 100. A contact hole may be formed in the insulating layer 120 to at least partially expose the first trace 117, and a contact 125 may be formed in the contact hole.

An intermediate trace 130 may be disposed on the insulating layer 120. In exemplary embodiments, the intermediate trace 130 may be electrically connected to the first trace 117 via the contact 125.

The intermediate trace 130 may be arranged to substantially correspond to the first trace 117. In exemplary embodiments, a plurality of the intermediate traces 130 may be arranged along the second direction, and may be alternately disposed on both lateral portions in the first direction of the touch sensor.

As described above, the first traces 117 may be alternately distributed on both lateral portions of the touch sensor, so that a spacing or pitch between the adjacent first traces 117 may be increased. Accordingly, an electrical connection margin or alignment margin may be increased while maintaining the number or integration degree of the first traces 117.

In a high-resolution touch sensor such as a fingerprint sensor, the pitch between the adjacent first traces 117 may be decreased. Accordingly, for example, when the contact hole for connecting the intermediate trace 130 is formed, the adjacent first traces 117 may be exposed together due to an etching resolution limit of the insulating layer. In this case, when the contact 125 is formed in the contact hole, a short-circuit in the adjacent first traces 117 may be caused.

However, according to the above-described exemplary embodiments, the pitch may be increased by alternately distributing the first traces 117 on both lateral portions of the touch sensor. Accordingly, an alignment margin for forming the contact 125 may be additionally obtained, so that a sensing sensitivity and a signal transmission of high reliability and high resolution may be realized.

For example, in a flexible display device, when the touch sensor is folded along a virtual folding line 10 as indicated in FIG. 1, a sensing or signal transmission failure may be caused by a breakage or crack of the electrode layer. However, according to exemplary embodiments, the first traces 117 may be distributed alternately on both sides, so that a possibility of a sensing malfunction in the first electrode layer may be entirely reduced, and an area where a sensing function is maintained may be increased.

The second electrode layer 140 may include second sensing unit electrodes 142 and a second connector 145. The second sensing unit electrodes 142 may be arranged so as not to overlap the first sensing unit electrodes 112 in a planar view.

For example, the second sensing unit electrodes 142 may be connected to each other by the second connectors 145 and may be arranged in the second direction. Accordingly, a second sensing electrode column extending in the second direction may be defined. A plurality of the second sensing electrode columns may be arranged along the first direction.

In exemplary embodiments, the second connector 145 and the second sensing electrode unit electrodes 142 may be integrally connected to each other and may be provided as a substantially single member.

The second electrode layer 140 may further include second traces 147. In exemplary embodiments, the second trace 147 may branch and extend from one end portion of each of the second sensing electrode columns.

The intermediate traces 130 and the second traces 147 may be located at the same layer or at the same level. In exemplary embodiments, the intermediate traces 130 and the second traces 147 may extend on the upper surface of the insulating layer 120 and may be spaced apart from each other and assembled at one end portion of the touch sensor or insulating layer 120.

For example, terminal end portions of the intermediate traces 130 and the second traces 147 may be assembled together at the one end portion of the touch sensor or the insulating layer 120 such that a pad region for bonding or connecting to a circuit connection structure such as, e.g., a flexible printed circuit board (FPCB) may be defined.

In some embodiments, a capping layer 150 may be formed on the terminal end portions of the intermediate traces 130 and the second traces 147. The capping layer 150 may serve as a pad portion or a terminal portion for the bonding to the circuit connection structure, and may protect the terminal end portions of the traces in a bonding process.

For example, a conductive intermediate structure such as an anisotropic conductive film (ACF) may be inserted between the capping layer 150 and the circuit connection structure during the bonding process.

For example, the capping layer 150 may be formed of a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, a passivation layer (not illustrated) may be formed on the insulating layer 120 to cover, e.g., the second electrode layer 140 and the intermediate traces 130. The passivation layer may be partially removed from the pad region to expose the capping layer 150 for the bonding process.

The touch sensor according to the above-described exemplary embodiments may be used as a high-resolution sensor such as a fingerprint sensor. For example, a width or pitch of the sensing unit electrodes 112 and 142 may be 100 μm or less, preferably 70 μm or less, more preferably 50 μm or less.

The sensing unit electrodes 112 and 142 of the fine pitch or width may be distributed at different layers, so that a patterning limit or an alignment margin may be achieved to easily arrange the unit electrodes with high integration degree or density.

Additionally, the bonding process for the first and second traces 117 and 147 may be performed at the same layer by using the intermediate traces 130, so that the connection with the circuit connection structure may be easily implemented.

FIGS. 1 to 3 illustrate that the first electrode layer 110 is disposed on the base layer 100 and the second electrode layer 140 is disposed on the first electrode layer 110.

However, in some embodiments, the second electrode layer 140 may be disposed on the base layer 100, and then the insulating layer 120 may cover the second electrode layer 140. The first electrode layer 110 may be formed on the insulating layer 120.

In this case, the intermediate traces 130 and the second traces 147 may be disposed on the base layer 100 together, and the first traces 117 may each be electrically connected to the intermediate trace 130 via the contact 125.

Figure 4:
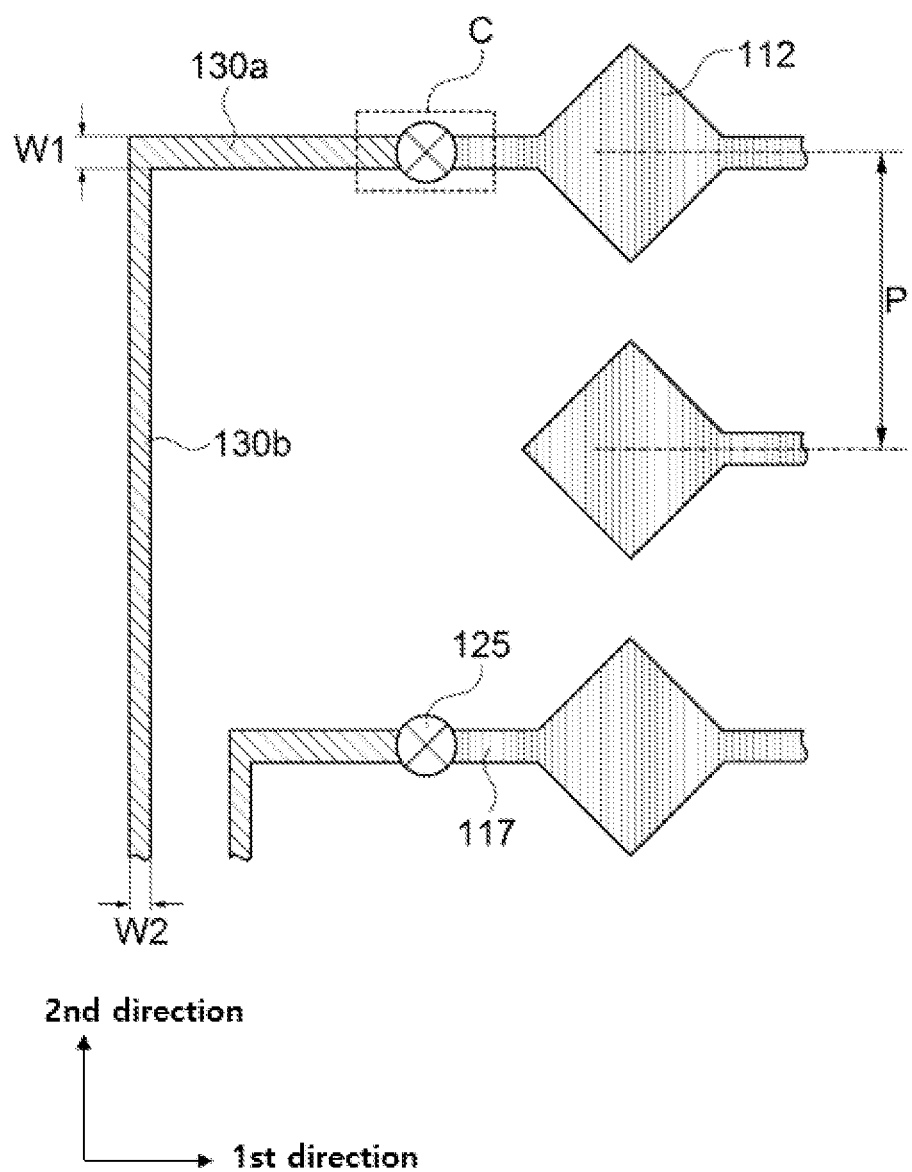
FIG. 4 is a partially enlarged top planar view illustrating a touch sensor in accordance with some exemplary embodiments.

FIG. 4 is a partially enlarged top planar view illustrating a touch sensor in accordance with some exemplary embodiments.

Referring to FIG. 4, a width (a first width in the second direction) W1 of the first trace branching from the first sensing electrode row including the first sensing unit electrodes 112 may satisfy Equation 1 below.

$$0.1P \leq W1 < 2P \qquad \text{[Equation 1]}$$

In Equation 1, P is a pitch of the first sensing electrode row.

As described above, according to exemplary embodiments, the first traces 117 may be alternately arranged at both lateral portions of the touch sensor, so that the alignment margin between the first traces 117 neighboring in the second direction may be increased.

Accordingly, the width of the first trace 117 may be relatively increased as expressed by Equation 1, and a channel resistance through the first sensing unit electrode 112 or the first sensing electrode row may be reduced. If the first width W1 is less than 0.1 P, the channel resistance may excessively increase.

In a connection region C indicated in FIG. 4, the first trace 117 and the intermediate trace 130 may be electrically connected to each other via the contact 125. A width of the intermediate trace 130 in the connection region C may also be increased to reduce a contact resistance.

In some embodiments, a width of the intermediate trace 130 in the connection region C may also satisfy Equation 1 and may be expressed as the first width W1.

The intermediate trace 130 may include a first portion 130a and a second portion 130b. The first portion 130a may refer to a portion connected to the first trace 117 in the connection region C and extending in the first direction. The second portion 130b may refer to a portion that is bent from an end of the first portion 130a and extends in the second direction.

In some embodiments, the width W1 of the first portion 130a of the intermediate trace 130 may be greater than a width (a second width in the first direction) W2 of the second portion 130b. As described above, the channel resistance may be reduced by increasing the width of the first portion 130a by utilizing the alignment margin achieved from the alternating arrangement of the traces.

As described above, the touch sensor may be applied as a fingerprint sensor, and an interval P between the sensing unit electrodes neighboring each other may be 100 μm or less. A sheet resistance of the sensing unit electrode may be about 0.05 to 10Ω/□, preferably about 0.05 to 5Ω/□, more preferably about 0.05 to 3Ω/□.

Figure 5:
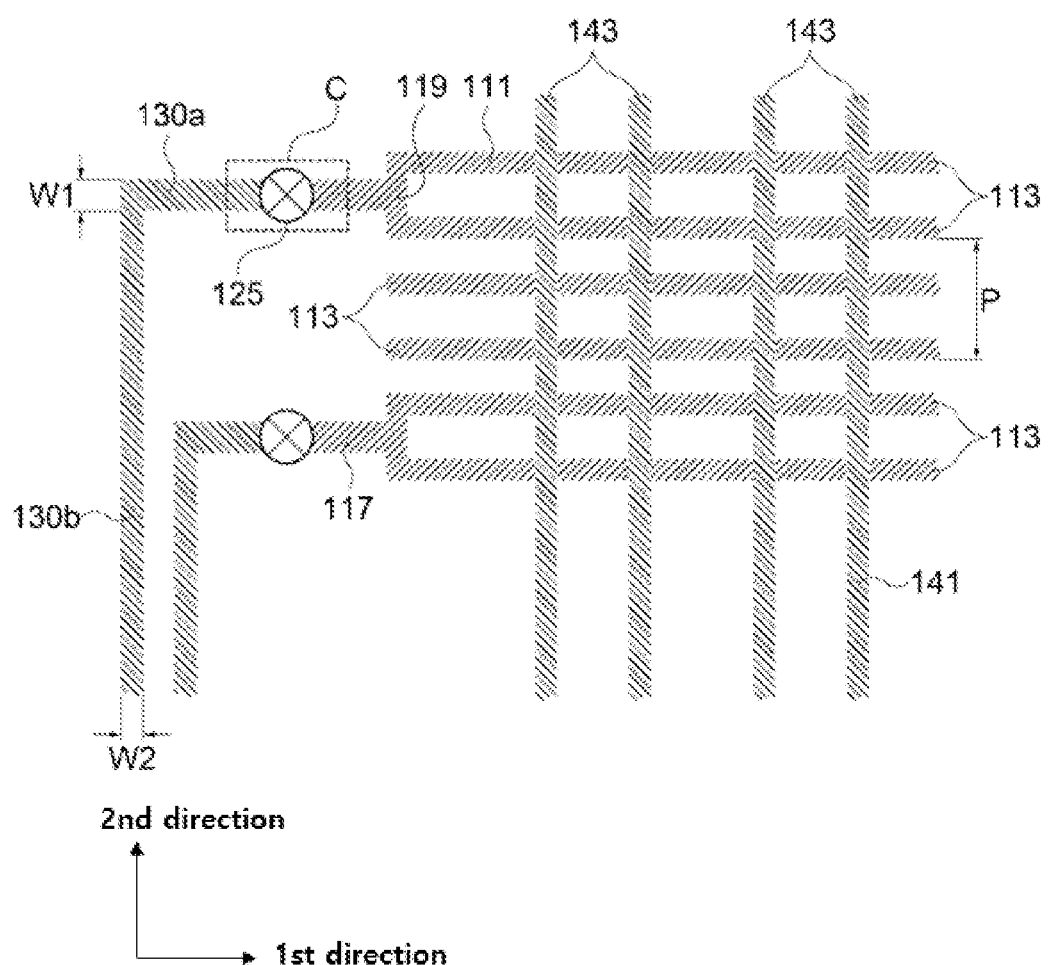
FIG. 5 is a partially enlarged top planar view illustrating a touch sensor in accordance with some exemplary embodiments.

FIG. 5 is a partially enlarged top planar view illustrating a touch sensor in accordance with some exemplary embodiments. Detailed descriptions on elements and/or structures substantially the same as or similar to those described with reference to FIG. 4 are omitted herein.

Referring to FIG. 5, each of the first sensing electrode row and the second sensing electrode column may include at least one sub-electrode line.

For example, the first sensing electrode row 113 may include a plurality of first sub-electrode lines 111 extending in the first direction, and the second sensing electrode column 143 may include a plurality of second sub-electrode lines 141.

In some embodiments, end portions of the plurality of first sub-electrode lines 111 extending in the first direction may be connected in parallel by, e.g., a first merging portion 119 extending in the second direction to define the first sensing electrode row 113. The plurality of the second sub-electrode lines 141 extending in the second direction may be connected in parallel by a second merging portion (not illustrated) extending in the first direction to define the second sensing electrode column 143.

The first traces 117 may extend from the first merging portion 119 alternately at both lateral portions of the touch sensor.

As described above, the width (the first width in the second direction) W1 of the first trace 117 may satisfy Equation 1 below.

$$0.1P \le W1 < 2P \qquad \text{[Equation 1]}$$

In Equation 1, P is a pitch of the first sensing electrode row.

Figure 6:
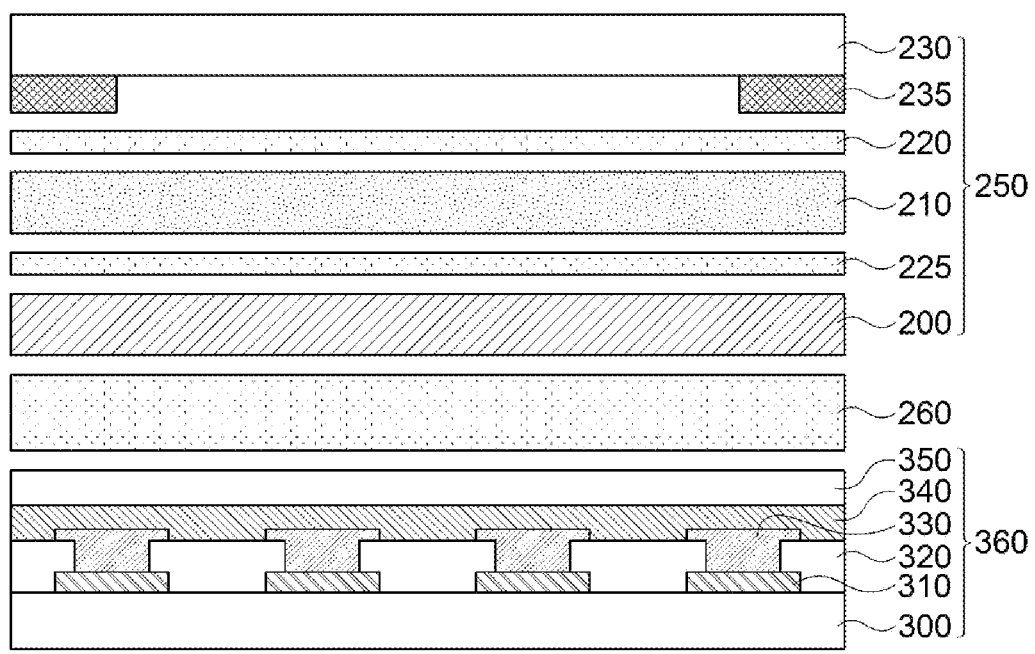
FIG. 6 is a schematic cross-sectional view illustrating a window stack structure and an image display device in accordance with exemplary embodiments.

FIG. 6 is a schematic cross-sectional view illustrating a window stack structure and an image display device in accordance with exemplary embodiments.

Referring to FIG. 6, a window stack structure 250 may include a window substrate 230, a polarizing layer 210 and a touch sensor 200 according to the above-described exemplary embodiments.

The window substrate 230 may include, e.g., a hard coating film. In an embodiment, a light-shielding pattern 235 may be formed on a peripheral portion of one surface of the window substrate 230. The light-shielding pattern 235 may include, e.g., a color-printed pattern, and may have a single-layered or multi-layered structure. A bezel portion or a non-display area of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may be included in the window stack structure 250 as a form of a film or a panel. In an embodiment, the touch sensor 200 may be combined with the polarizing layer 210 via a second adhesive layer 225.

As illustrated in FIG. 6, the window substrate 230, the polarizing layer 210 and the touch sensor 200 may be sequentially positioned from a viewer's side. In this case, the electrode layer of the touch sensor 200 may be disposed under the polarizing layer 210 so that electrodes may be effectively prevented from being seen by the viewer.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

An image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and an insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

What is claimed is:

1. A touch sensor, comprising:
a base layer;
a first electrode layer disposed on the base layer, the first electrode layer comprising:
a plurality of first sensing electrode rows extending in a first direction parallel to a top surface of the base layer; and
first traces branched from each of the first sensing electrode rows and alternately distributed on both lateral portions of the base layer;
a second electrode layer disposed on the base layer, the second electrode layer disposed at a different layer from that of the first electrode layer,
where in the second electrode layer comprising:
a plurality of second sensing electrode columns extending in a second direction that is parallel to the top surface of the base layer and intersects the first direction;
second traces branching from the second sensing electrode columns; and
an intermediate trace electrically connected to each of the first traces, the intermediate trace comprising a first portion connected to each of the first traces and a second portion bent from the first portion,
wherein a width of the first portion of the intermediate trace is greater than a width of the second portion of the intermediate trace and satisfies Equation 1 below:

$$0.1P \le W1 < 2P \qquad \text{[Equation 1]}$$

wherein W1 represents the width of the first portion of the intermediate trace, and P is a pitch of the first sensing electrode rows.

2. The touch sensor of claim 1, wherein the first traces are alternately connected to one end portions and the other end portions of the first sensing electrode rows.

3. The touch sensor of claim 2, wherein a width of each of the first traces satisfies Equation 1 below:

$$0.1P \leq W1 < 2P \qquad \text{[Equation 1]}$$

wherein W1 represents the width of the first trace, and P is a pitch of the first sensing electrode rows.

4. The touch sensor of claim 1, further comprising an insulating layer formed on the base layer and formed between the first electrode layer and the second electrode layer.

5. The touch sensor of claim 4, wherein the intermediate trace and the second electrode layer is disposed at the same layer.

6. The touch sensor of claim 5, further comprising a contact penetrating through the insulating layer to connect the intermediate trace and each of the first traces with each other.

7. The touch sensor of claim 5, terminal end portions of the intermediate trace and the second traces are assembled together on one end portion of the insulating layer.

8. The touch sensor of claim 7, further comprising a capping layer formed on the terminal end portions of the intermediate trace and the second traces.

9. The touch sensor of claim 8, wherein the capping layer includes a transparent conductive oxide.

10. The touch sensor of claim 1, wherein the first sensing electrode row comprises a plurality of first sensing unit electrodes connected to each other along the first direction; and
the second sensing electrode column comprises a plurality of second sensing unit electrodes connected to each other along the second direction.

11. The touch sensor of claim 10, wherein a sheet resistance of each of the first sensing unit electrodes and the second sensing unit electrodes is from 0.05 to 10Ω/□.

12. The touch sensor of claim 10, wherein each of the first sensing unit electrodes and the second sensing unit electrodes has a width of 100 μm or less, and the first sensing unit electrodes and the second sensing unit electrodes are provided as fingerprint sensing electrodes.

13. The touch sensor of claim 1, wherein the first sensing electrode row comprises a plurality of first sub-electrode lines extending in the first direction and connected in parallel to each other; and
the second sensing electrode column comprises a plurality of second sub-electrode lines extending in the second direction and connected in parallel to each other.

14. The touch sensor of claim 13, further comprising merging portions connecting the first sub-electrode lines to each other to define the first sensing electrode row, and connecting the second sub-electrode lines to each other to define the second sensing electrode column,
wherein the first traces and the second traces extend from each of the merging portions.

15. A window stack structure, comprising:
a window substrate; and
the touch sensor of claim 1.

16. An image display device, comprising:
a display panel; and
the touch sensor of claim 1 stacked on the display panel.

* * * * *